US010137047B1

(12) United States Patent
DiFrancesco

(10) Patent No.: US 10,137,047 B1
(45) Date of Patent: Nov. 27, 2018

(54) AUTOMATED PILOTLESS AIR AMBULANCE

(71) Applicant: Joseph C. DiFrancesco, Monterey, CA (US)

(72) Inventor: Joseph C. DiFrancesco, Monterey, CA (US)

( * ) Notice: Subject to any disclaimer, the term of this patent is extended or adjusted under 35 U.S.C. 154(b) by 0 days.

(21) Appl. No.: 15/469,329

(22) Filed: Mar. 24, 2017

Related U.S. Application Data

(60) Provisional application No. 62/372,482, filed on Aug. 9, 2016.

(51) Int. Cl.
| | | |
|---|---|---|
| *A61G 3/00* | (2006.01) | |
| *B64C 39/02* | (2006.01) | |
| *A61G 12/00* | (2006.01) | |
| *G05D 1/00* | (2006.01) | |
| *G08G 5/00* | (2006.01) | |

(Continued)

(52) U.S. Cl.
CPC ............ *A61G 12/001* (2013.01); *B64C 27/08* (2013.01); *B64C 39/024* (2013.01); *B64D 17/72* (2013.01); *B64D 17/80* (2013.01); *G05D 1/0088* (2013.01); *G08G 5/0039* (2013.01); *G08G 5/0086* (2013.01)

(58) Field of Classification Search
CPC ........ A61G 12/001; A61G 3/00; A61G 3/001; B64D 27/26; B64D 11/062; B64C 13/18; B64C 25/14; B64C 39/024; A63H 33/20; B63C 9/01; G05D 1/0202; G05D 1/02
See application file for complete search history.

(56) References Cited

U.S. PATENT DOCUMENTS

| | | | | |
|---|---|---|---|---|
| 3,432,962 A | * | 3/1969 | Boese ..................... | A63H 33/20 446/49 |
| 4,352,991 A | * | 10/1982 | Kaufman ............... | A61G 3/001 296/20 |

(Continued)

FOREIGN PATENT DOCUMENTS

| | | |
|---|---|---|
| CN | 104802986 | 7/2015 |
| CN | 105030429 | 7/2015 |

(Continued)

OTHER PUBLICATIONS http://www.argodesign.com/work/drone-ambulance-argodesign.html on or about Jan. 5, 2017.

*Primary Examiner* — Yuri Kan
(74) *Attorney, Agent, or Firm* — JRG Attorneys at Law

(57) ABSTRACT

An automated pilotless air ambulance system. The system includes an air vehicle (AV) having a fuselage coupled to a stretcher for carrying a patient. The system is configured to fly the patient from a point of injury to a medical treatment facility. The system also has a plurality of air lift motors for vertically lifting the air vehicle. The system further includes a plurality of air-lift motors coupled to the fuselage forming a low profile. The air lift motors are centralized motors or de-centralized motors for vertically lifting the AV. The system also has an automated life support and monitoring patient suite having a plurality of life support and monitoring devices, including medical supplies. The system additionally has a bidirectional datalink coupled to the air vehicle for executing various functions such as communicating with a patient's or a first responder's mobile device.

20 Claims, 19 Drawing Sheets

(51) Int. Cl.
*B64D 17/80* (2006.01)
*B64D 17/72* (2006.01)
*B64C 27/08* (2006.01)

(56) References Cited

U.S. PATENT DOCUMENTS

| | | |
|---|---|---|
| 5,626,151 A | 5/1997 | Linden |
| 5,975,081 A | 11/1999 | Hood et al. |
| 6,817,573 B2 | 11/2004 | Harrison |
| 7,874,513 B1 | 1/2011 | Smith |
| 8,930,044 B1 | 1/2015 | Peeters et al. |
| 9,045,226 B2 | 6/2015 | Piasecki et al. |
| 2008/0243371 A1* | 10/2008 | Builta ............... G05D 1/0202 701/529 |
| 2014/0217230 A1* | 8/2014 | Helou, Jr. ............ B64C 25/14 244/17.17 |
| 2016/0200421 A1* | 7/2016 | Morrison ............ B64C 13/18 244/17.23 |
| 2016/0207625 A1 | 7/2016 | Judas et al. |
| 2016/0340006 A1* | 11/2016 | Tang ................. B63C 9/01 |
| 2017/0036771 A1* | 2/2017 | Woodman ........... B64D 27/26 |
| 2017/0166309 A1* | 6/2017 | Sekiya .............. B64D 11/062 |
| 2017/0197714 A1* | 7/2017 | Golden .............. B64C 39/024 |
| 2017/0327223 A1* | 11/2017 | Sekine et al. ......... B64C 39/02 |

FOREIGN PATENT DOCUMENTS

| | | | |
|---|---|---|---|
| CN | 105068486 | 11/2015 | |
| IN | 229664097 | 10/2015 | |
| IN | 201504097 | * 11/2015 | ............ A61G 3/00 |
| WO | WO-2016186380 A1 | * 11/2016 | ............ G05D 1/02 |

* cited by examiner

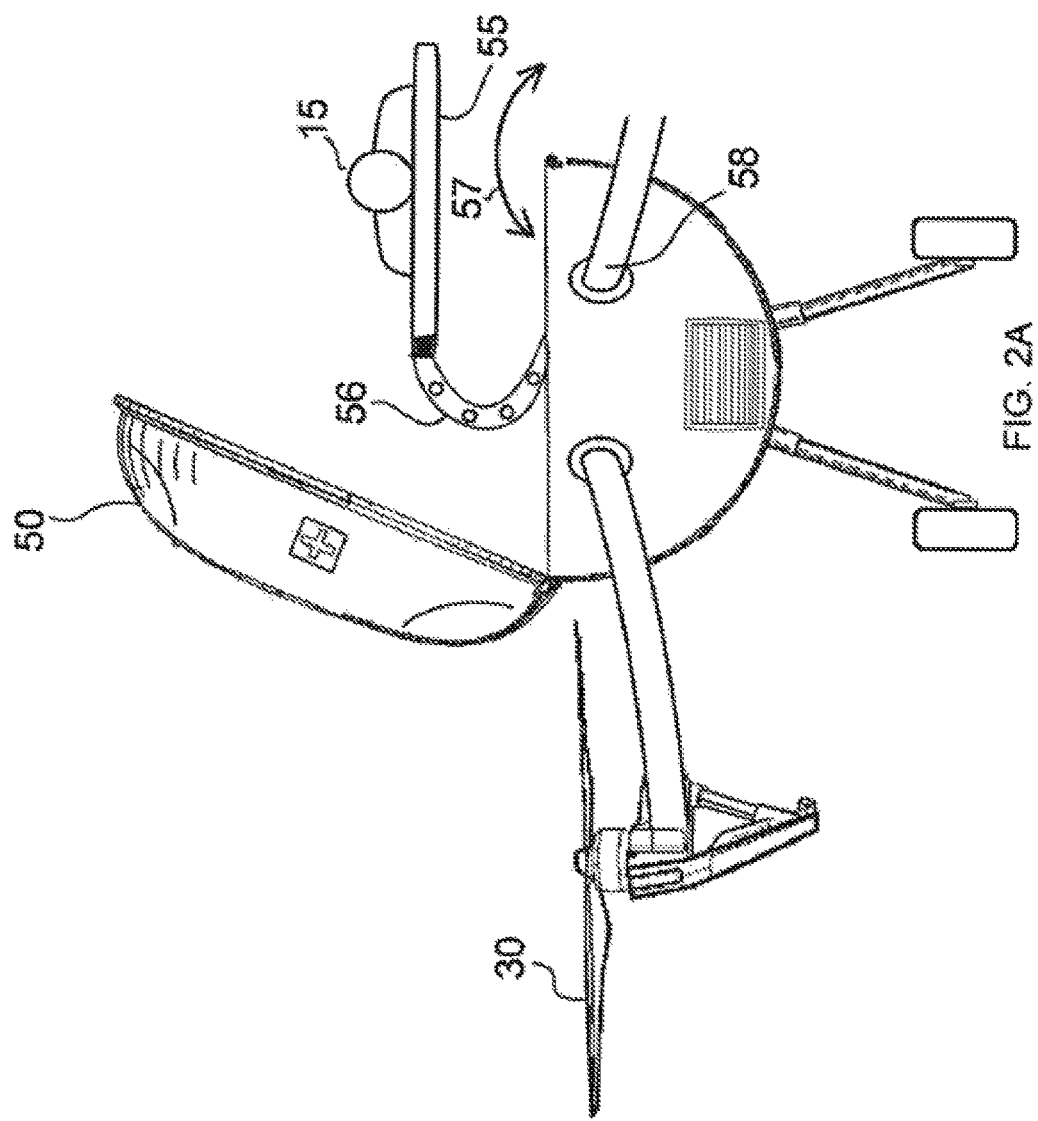

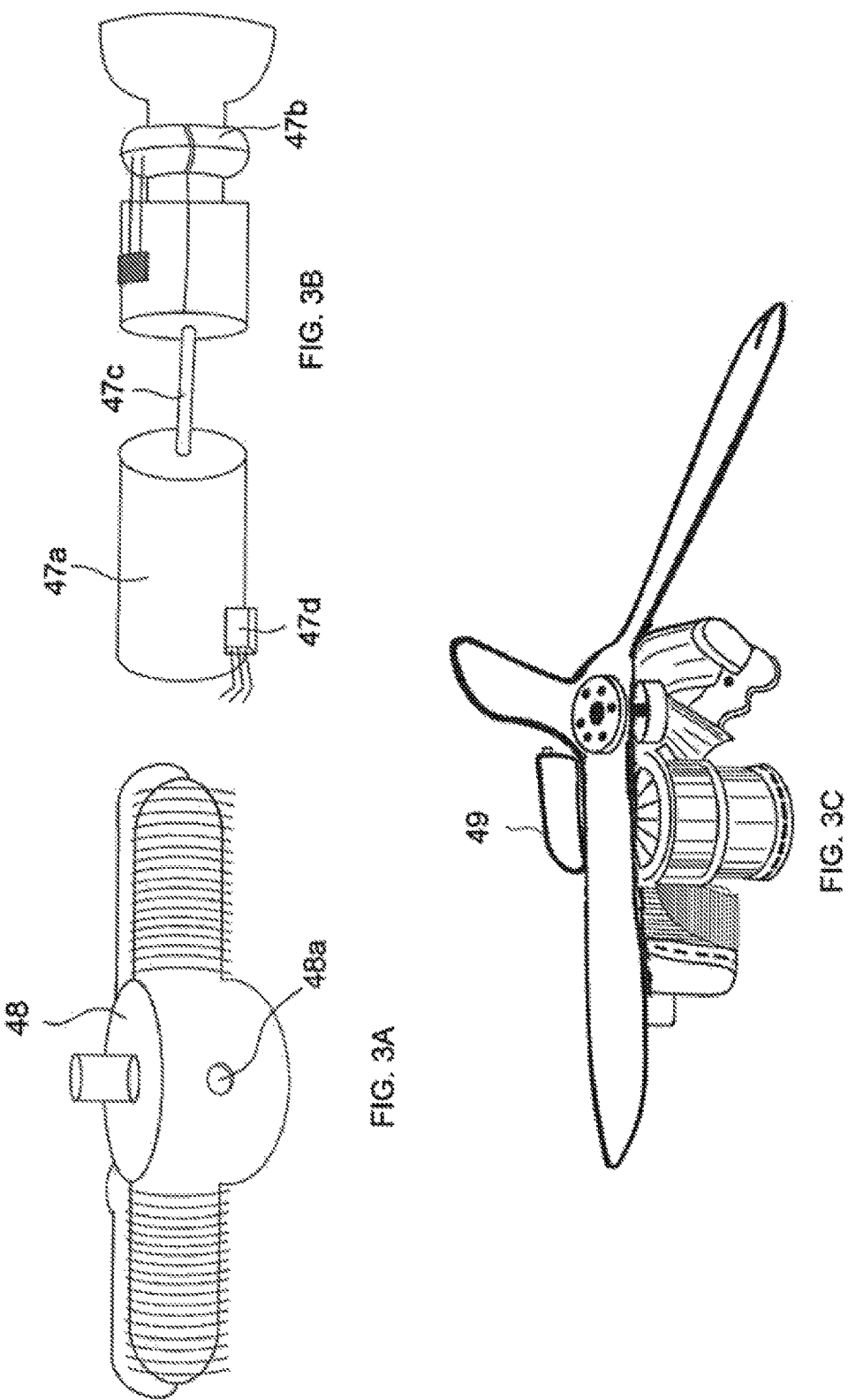

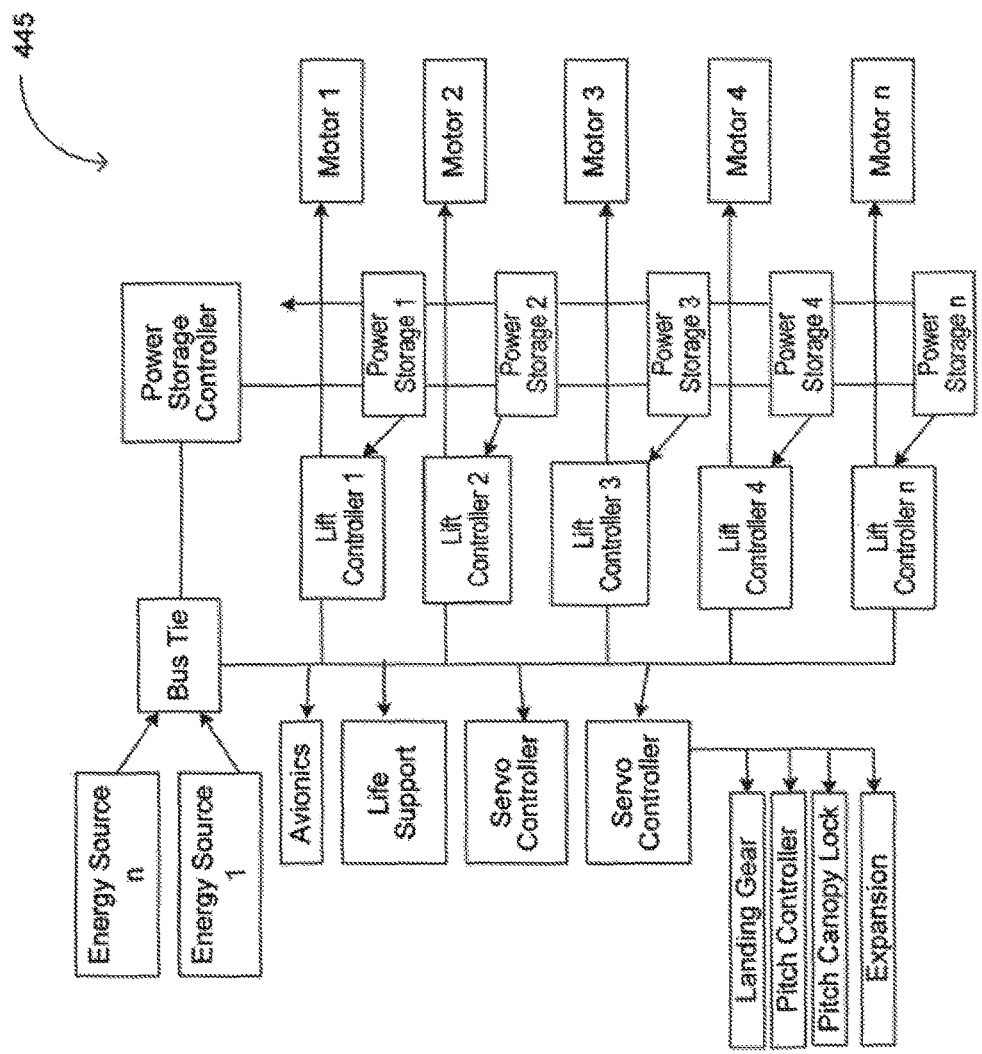

AUTOMATED PILOTLESS AIR AMBULANCE

PRIORITY CLAIM

This non-provisional application claims priority to Provisional Patent Application Ser. No. 62/372,482, entitled "Automated Pilotless Air Ambulance", filed on Aug. 9, 2016.

TECHNICAL FIELD

The present invention relates generally to the field of medical transportation and treatment, and more particularly to a(n) pilotless or unmanned, autonomous aerial medical evacuation vehicle.

BACKGROUND OF THE INVENTION

Medical rescue and evacuation teams have been used to rescue and evacuate injured patients to treatment centers. In the modern day, the manned (piloted) Medical Evacuation/Air Ambulance service (Military nomenclature: MEDEVAC) is a common practice. Generally, such an evacuation utilizes a large manually piloted vehicle, and depending on location, it is typically a helicopter and/or airplane.

In a military setting, a group of soldiers may call for MEDEVAC to rescue an injured comrade from a dangerous combat situation in restrictive terrain. However, in such a situation, a MEDEVAC air crew may be put in just as dire a situation as the patient. In many combat situations, MEDEVAC aircraft have to deal with both dangerous flying and landing situations (e.g., weather, terrain, etc.), as well as threats from hostile forces. In a military setting, a MEDEVAC aircraft may be required to extract an injured soldier from very restrictive locations, such as urban areas or other confined/remote locations. MEDEVAC missions require highly trained air crews, extensive maintenance and logistical support and require time for the crew to pre-flight, conduct mission planning, start up and take-off. This additional time requirement decreases a patient's chance of survival especially if it exceeds the industry standard "Golden Hour". Additionally, hostile forces may target MEDEVAC aircraft in order to generate additional casualties and/or captives.

In a more civilian type setting, the use of drones or unmanned aerial vehicles (UAVs) has become an emergent technology for precise and rapid short distance delivery. While small unmanned drone technology has developed, there exists no such pilotless vehicle today which can adequately perform MEDEVAC or Air Ambulance operations autonomously.

While some commercial drones have been repurposed for medical services, they continue to suffer from the same limitations of their delivery counterpart; that is that they are meant for small payloads over the course of short distances. A typical delivery drone is capable of traveling approximately 60 miles if it is only carrying a 5 lbs/2 kg payload. The average adult male weighs approximately 180 lbs. In a combat scenario, a soldier may be carrying an additional 70 lbs. of equipment. It is currently not possible for a typical delivery drone to transport the required payload to perform the necessary MEDEVAC/Air Ambulance operations. Due to size and power restrictions, current drones are only capable of delivering minor medical supplies and/or medicine to a desired area.

In addition to the design flaws for a delivery drone, the typical delivery drone cannot merely be repurposed for MEDEVAC/Air Ambulance purposes. In a traditionally manned MEDEVAC/Air Ambulance, the transport is capable of including a trauma or medical team that is capable of at least monitoring the patient, and relaying important medical information to the treatment center while providing immediate but basic treatment to the patient. A treatment facility with adequate notification of a patient's critical needs may ensure appropriate resources (surgical theaters, specialists, blood, etc.) are staged for the patient arrival. A traditional unmanned vehicle is unable to perform these functions. Additionally, the device may be utilized to transport time sensitive organs or medical supplies as required.

In light of the shortcomings in the prior art, there clearly exists a need for a high payload capacity, high performance pilotless aerial vehicle to perform MEDEVAC/Air Ambulance and rescue operations in emergency situations.

SUMMARY OF THE INVENTION

The present invention is a new unmanned/pilotless vertical air lift rescue and MEDEVAC/Air Ambulance capable vehicle having a low profile that is configured to retrieve injured individuals and transport those individuals to a treatment center.

The present invention also provides for at least one powerplant or power supply which provides energy (electrical, mechanical or chemical) to at least one powered air lift motor which functions in a cooperative fashion.

The present invention additionally includes a patient monitoring and treatment suite that is appropriately configured to execute the following biomedical functions: monitor medical sensors connected to the patient; provide remote treatment options to a responder and/or a physician for treating the patient; provide real time vital statistics of the patient to the responder and/or the physician; and administer medical aid and/or treatment to the patient at the point of injury and enroute to the treatment facility.

The present invention further includes a bidirectional datalink configured to execute various functions. For example, the bidirectional datalink can be configured to receive and send signals to a network and/or database having valuable medical records and/or valuable information corresponding to a patient. Similarly, the bidirectional datalink can be configured to receive and send signals via a network that allows patients and insurance companies to subscribe to an ambulatory service that offers access to a(n) pilotless or unmanned, autonomous aerial medical evacuation vehicle. This service would advantageously allow the subscribers to have priority access to the autonomous aerial medical evacuation vehicle.

The present invention advantageously includes a terrain and motion sensing device coupled thereon for allowing the air vehicle to beneficially map at least one landing zone for allowing the air vehicle to land safely.

The present invention also includes navigation and terrain sensors coupled to the air vehicle that are advantageously configured to identify terrain obstacles for allowing the air vehicle to safely take off, land, navigate to a destination point, land and expediently avoid obstacles both in the landing phase and enroute phase.

The present invention is advantageously structured to include an air vehicle and/or an unmanned aerial vehicle (UAV) (e.g., multi or single helicopter) such as a drone or a fixed wing UAV having a low profile that can carry and/or transport at least one patient.

The present invention is also configured to carry and/or transport at least one patient and may optionally be designed in other embodiments to carry at least one first responder during medical emergency situations.

In an additional embodiment of the present invention, the air vehicle is suitably configured to autonomously navigate to a point of injury, utilizing uncontrolled or controlled air space, receive and respond to air traffic control instructions and e-file flight plans as necessary.

The present invention additionally includes in one embodiment a two-way video intercom coupled to the air vehicle to allow the medical treatment facility to visually observe and to verbally communicate with the patient via the bidirectional datalink.

In a further embodiment of the invention, the system incorporates a mobile device, such as a tablet computer, a smartphone or a handheld computer. The software integrating the air vehicle to the supported IT network will utilize geolocation service from the user's smart phone, tablet computer or other device to provide a destination for the Air Vehicle when dispatched. The application will have cross platform compatibility. The mobile device permits users to communicate directly with the air vehicle dispatch software and subscriber database.

Another feature of one embodiment of the present invention is to provide a triple redundant commercial avionics suite that will include redundant radio navigation and communication hardware.

An additional feature of one embodiment of the present invention is to provide an air vehicle configured to abide by all local UAS aviation statues and rules.

Optionally, one embodiment of the present invention further includes an emergency recovery system, such as a ballistic parachute configured to deploy rapidly, thereby enabling the device to have an expanded recovery envelope in emergency situations (e.g., power loss).

The present invention also provides in one embodiment of the present invention a biomedical monitoring system, coupled to a wireless datalink to allow for the vehicle to advantageously keep the treatment center in constant update as to the patient's status.

The present invention includes an unmanned vertical air lift rescue and evacuation vehicle that is suitably configured to include a power plant or power storage device, a lift generation system, capable of generating the required force to transport a patient, biomedical monitoring devices, onboard flight computers and an avionics suite.

The present invention is also designed in one embodiment to be remotely dispatched or called and sent to the patient's position.

The present invention may also be transported on the ground or by air and rapidly assembled and activated.

The present invention is further designed in one embodiment to be used in conjunction with navigation systems, not limited to GPS, to autonomously navigate to the patient position without the need of pilot interference.

It is a further feature of the present invention to include appropriate sensors in conjunction with an onboard avionics and flight computer system to allow the rescue and evacuation vehicle to perform local, precision navigation.

The present invention provides in a another embodiment a method to MEDEVAC/Air Ambulance an injured patient with an unmanned vertical air lift rescue and evacuation vehicle, including calling the evacuation vehicle via a networked device, securing the patient into the evacuation vehicle, connecting the patient to an onboard medical device, and dispatching the evacuation vehicle to a treatment center.

An additional feature of the present invention is a deconstructed unmanned vertical air lift rescue and evacuation vehicle, which may be beneficially airdropped or ground transported to a desired location and assembled on site.

Consequently, for a better understanding of the present invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIGS. 2A and 2B show a front view of the AV.

FIGS. 3A, 3B and 3C illustrate onboard or individual engines for various embodiments of the present invention.

FIG. 4A shows a flowchart for centralized power distribution/generation.

DETAILED DESCRIPTION OF THE INVENTION

Introduction

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

One embodiment of the present invention provides an automated pilotless air ambulance system (See FIGS. 1A-1D). The system includes an air vehicle having a fuselage, the fuselage having a stretcher coupled thereon for carrying a patient, the air vehicle (AV) configured to be dispatched to a point of injury of the patient and configured to transport the patient to a medical treatment facility. The system also includes a plurality of powered air-lift motors coupled to the fuselage for vertically lifting the AV. The system additional includes an automated life support and monitoring patient suite having a plurality of life support and monitoring devices and medical supplies, the patient suite configured to execute the following biomedical functions: monitor and provide commands to a plurality of medical-vital systems connected to the patient, the medical-vital systems are suitably configured to be remotely monitored and controlled; and communicate with the medical treatment facility via a datalink. Providers at the treatment facility may additionally send commands to the AV, allowing route changes and other flight deviations as required. The system further includes a bidirectional datalink coupled to the AV, the datalink configured to execute the following functions: receive and send signals to a patient's or first responder's mobile device or networked device having geolocation capabilities, thereby enabling the AV to obtain the geographic earth location of the patient; and receive and send signals to the patient's or first responder's mobile device for allowing the AV to be autonomously dispatched when contacted by the patient's or first responder's mobile device or networked device.

DETAILED DESCRIPTION

There are three identified sub blocks for the AV system: the air vehicle (AV) 100, the automated life support/monitoring suite 600/800 and the system integration 500/700. In one embodiment, the air vehicle (AV) includes a fuselage 10 connected to at least one lift generating device 30 that is coupled to said fuselage 10 for providing an advantageous low profile as illustrated in FIGS. 1A, 1B, 2A, and 2B. In this disclosure, lift generating device(s) 30 is also referred to as air lift motor(s) 30.

Figure 1A:
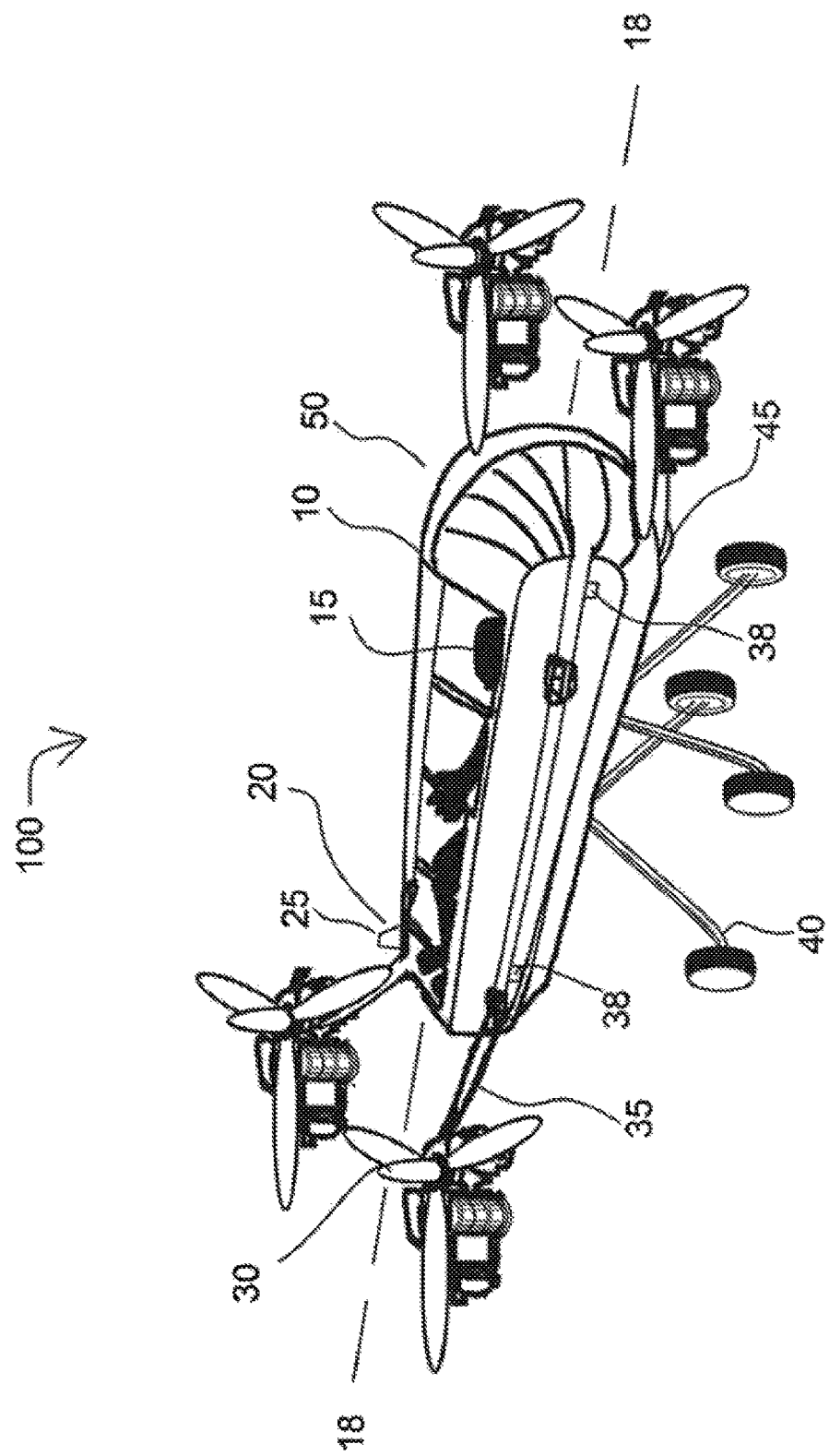
FIGS. 1A, 1B, 1C and 1D represent various embodiments of the air vehicle (AV).
Figure 1D:
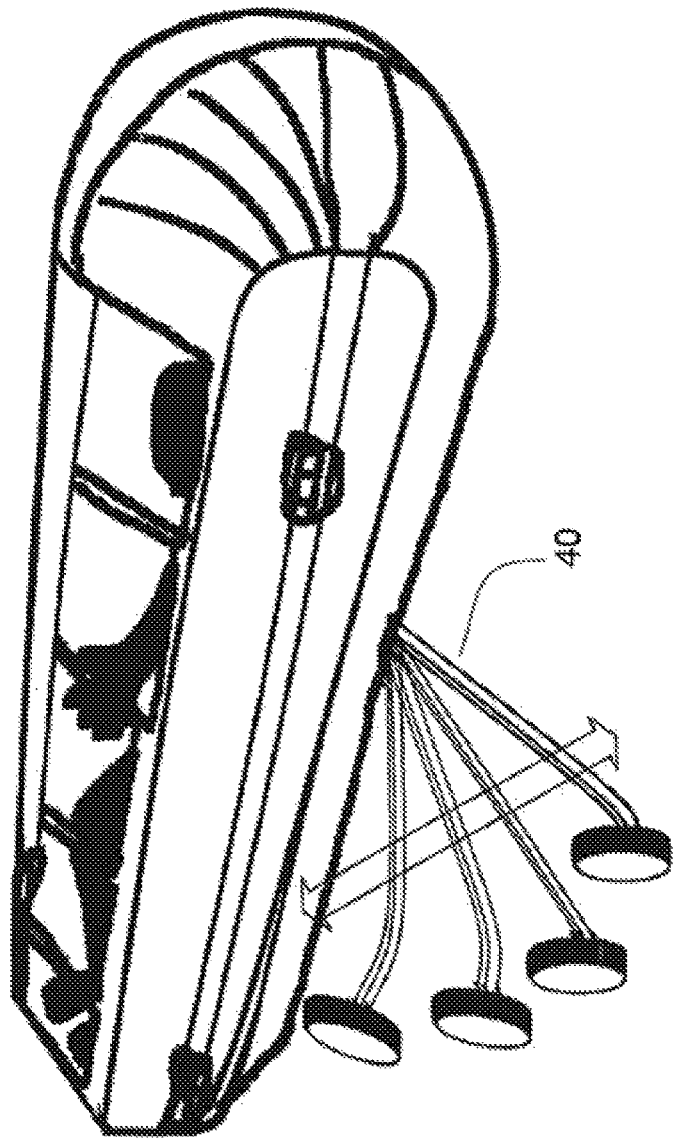
Figure 2B:
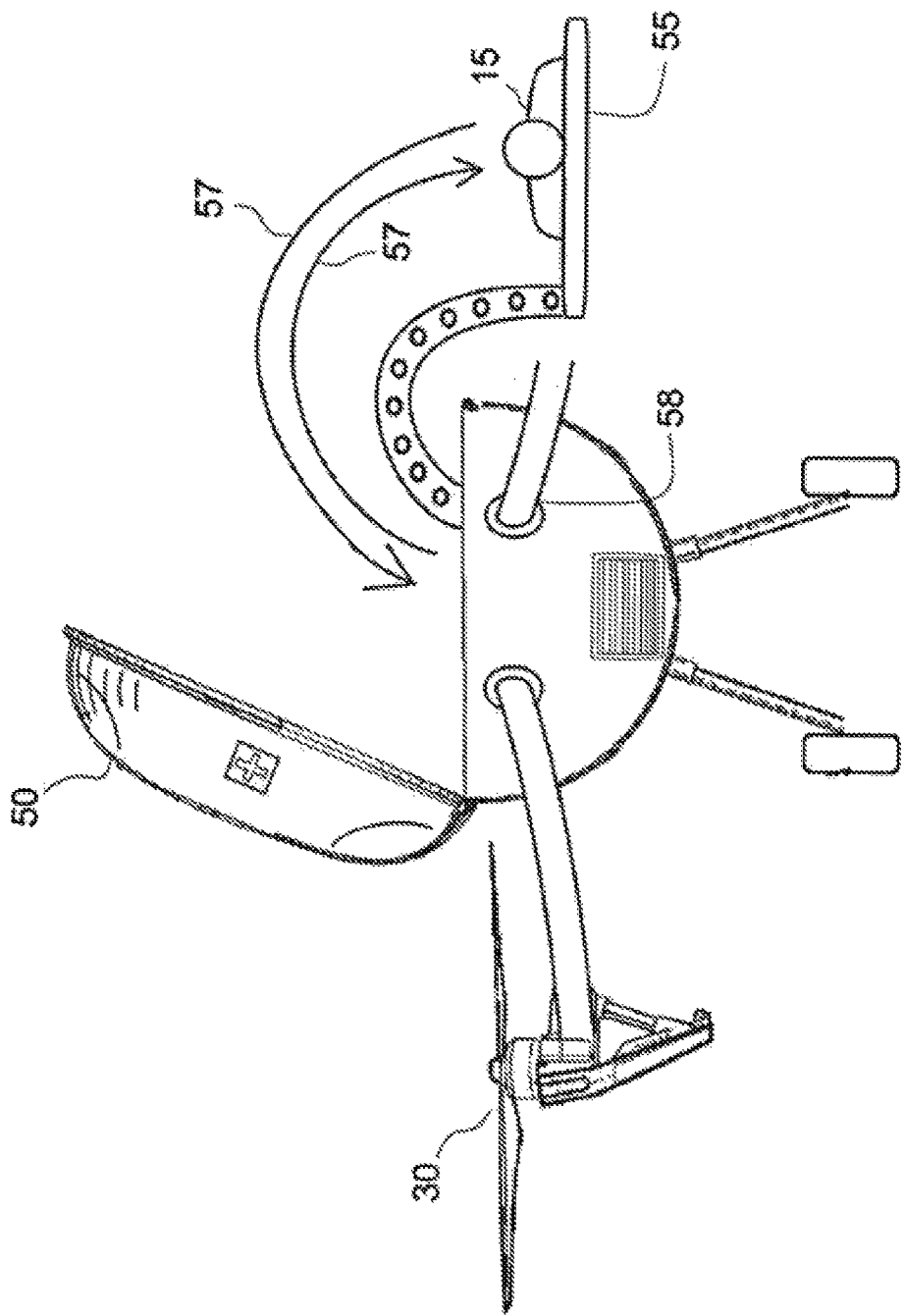
Figure 9:
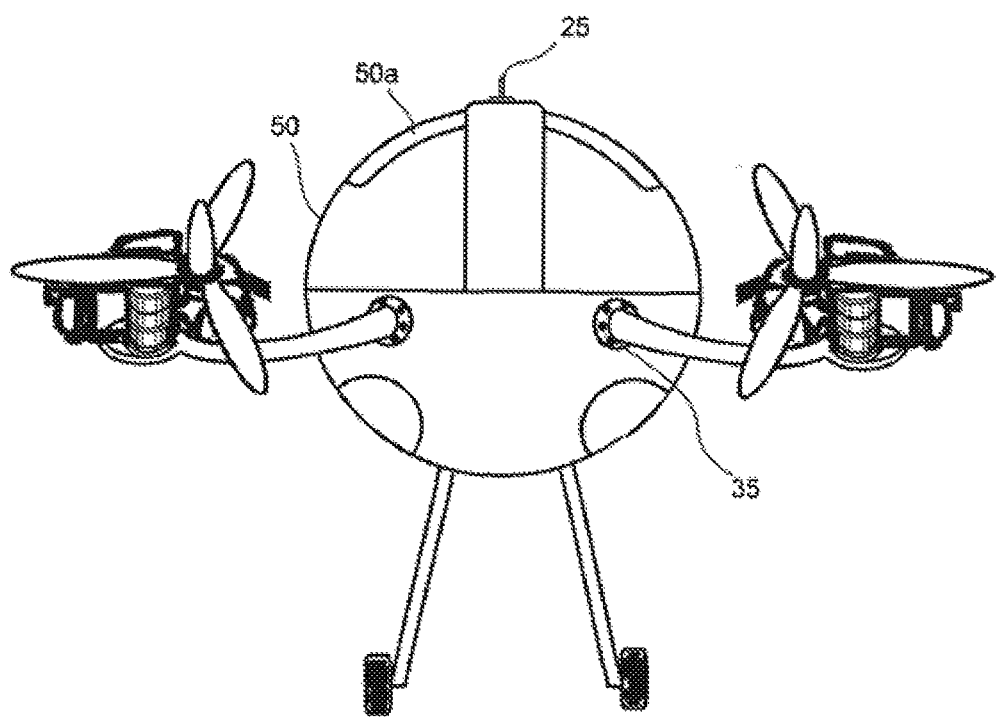
FIG. 9 shows a partial front view of the air vehicle (AV).

The AV 100, in the simplest description, is a fuselage 10 (also referred to as a capsule 10) connected to at least one or more lift generating devices 30 (e.g., rotors, jets, thrusters, electric motors, etc.) capable of flying a patient 15 from the point of injury to the nearest medical treatment facility (See FIGS. 1A, 2A and 2B). The AV 100 will also be suitably configured to have retractable landing gear 40 as illustrated in FIG. 1D. The AV 100 will be further configured to advantageously include a datalink antenna 25, a canopy 50/50A and proximity sensors 38 as shown in FIGS. 1A, 1D and 9.

In one embodiment of the present invention, the AV 100 includes a stretcher 55 coupled to a pivotal arm 56 that rotates 57 about an axis of rotation 58 as shown is FIGS. 2A-2B. The stretcher 55 is advantageously configured to remain horizontal with respect to the ground as the pivotal arm 56 is rotated to move the patient 15 into or out of the AV 100. This configuration allows the patient 15 to be easily transported or moved into or out of the AV capsule/fuselage.
Powerplant:

The AV 100 in one embodiment of the present invention also includes onboard power generation (i.e., centralized system) from two redundant compact turbine engines (See FIG. 3B) or in another embodiment individual engines (See FIGS. 1B and 3C) mounted directly to each lift generating device 30 (i.e. decentralized system). A turbo-generator (See FIG. 3B) is not the exclusive powerplant for the centralized system as any power generating system capable of powering the air lift motors 30 will be sufficient (See also FIG. 1C). A power source such as a battery 43 can provide power to avionics 600 and other systems while the engine and air lift motors 30 are shut down. The power source also augments the powerplant when additional power is required by the air lift motors 30.

Figure 1B:
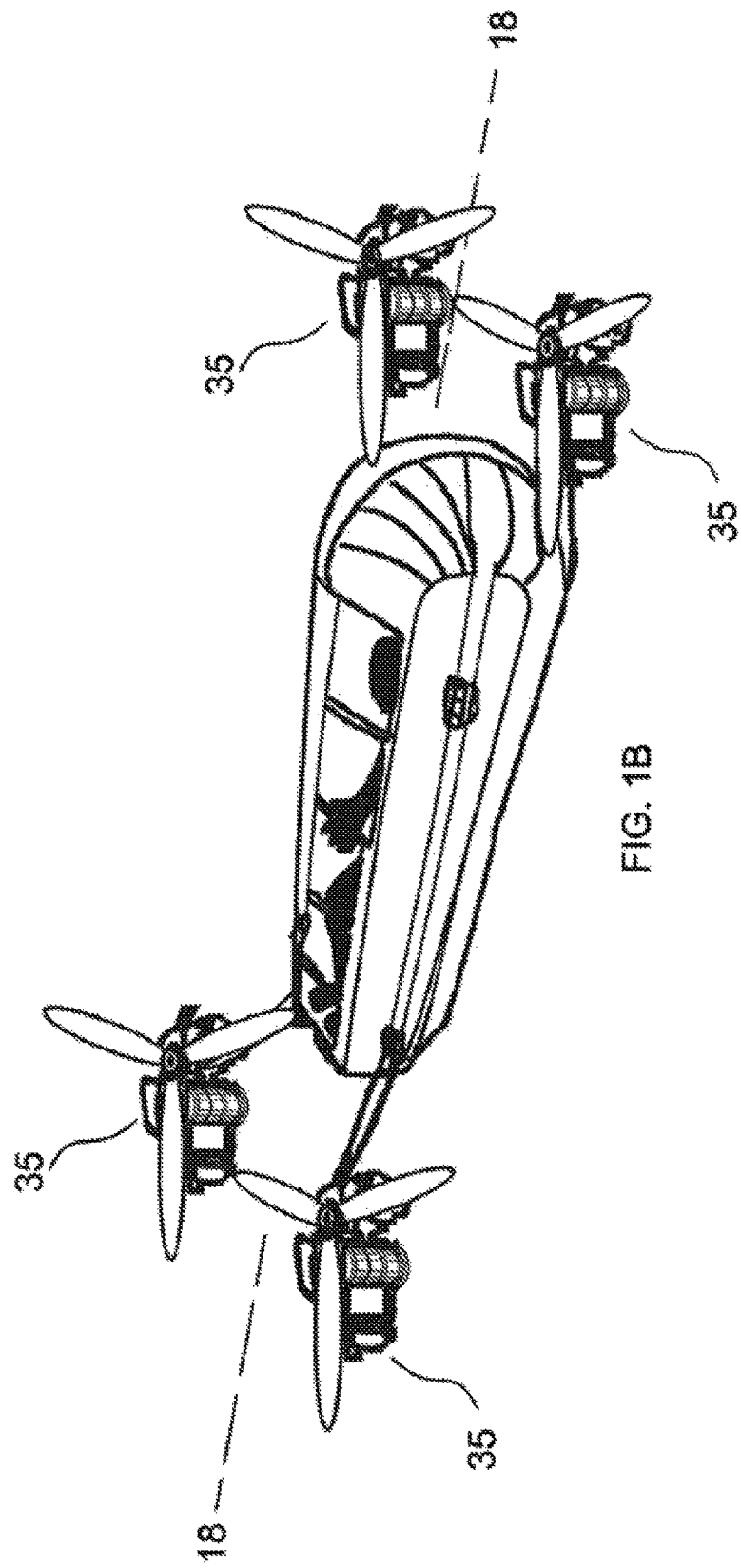

In another embodiment of the present invention, pylon mounted 49 decentralized powerplants (i.e., air lift motors 30) require the flight computer to meter fuel fuel/energy to each air lift motor 30 (See FIGS. 1B and 3C). This is accomplished through an electronic throttling system and requires little reconfiguration on the device (See FIG. 3C).
Lift Generation:

The AV 100 contains several air lift motors 30 (e.g., powered rotors) surrounding the fuselage 10. The motors 30 are mounted to at least one arm 35 for standoff as shown in FIGS. 1A, 1B, 1C, and 2A. The motors 30 may be compact high efficiency electric motors powered by the onboard power generation system (i.e., centralized system 8), or for the decentralized system 7 they may be individual engines (e.g., piston or turbine) 30 or another motor capable of providing sufficient thrust for lifting the AV 100 (See FIGS. 1B and 1C). The thrust of each lift generating motor 30 is individually controlled through either increased RPM for a fixed pitch system, variable pitch assemblies on the blades for a constant RPM system, or by varying thrust with an alternative air lift motor type (e.g., vectoring, gimballing, etc.). In alternative embodiments of the present invention, the low-profile design of the AV 100 can be suitably configured to include air lift motors 30 coupled to the sides or bottom of the fuselage 10 for forming the low profile configuration as shown in FIGS. 1A, 1B and IC. In a further embodiment of the present invention, the low-profile configuration is formed by having the patient nested in the AV 100 such that the air lift motors 30 are substantially disposed on the same plane 18 as the patient 15 and/or first responders (See FIGS. 1A-1B and ID).

In another embodiment of the present invention, the system derives thrust by multiple air lift motors 30 (e.g., rotor, thruster, jet exhaust, etc.) positioned around the fuselage 10 forming the low-profile configuration as shown in FIG. 1A. In this disclosure, patient capsule 10 also refers to the fuselage 10. The system of the present invention may be either centralized 8 or decentralized 7 (See FIGS. 1B and 1C).

Figure 1C:
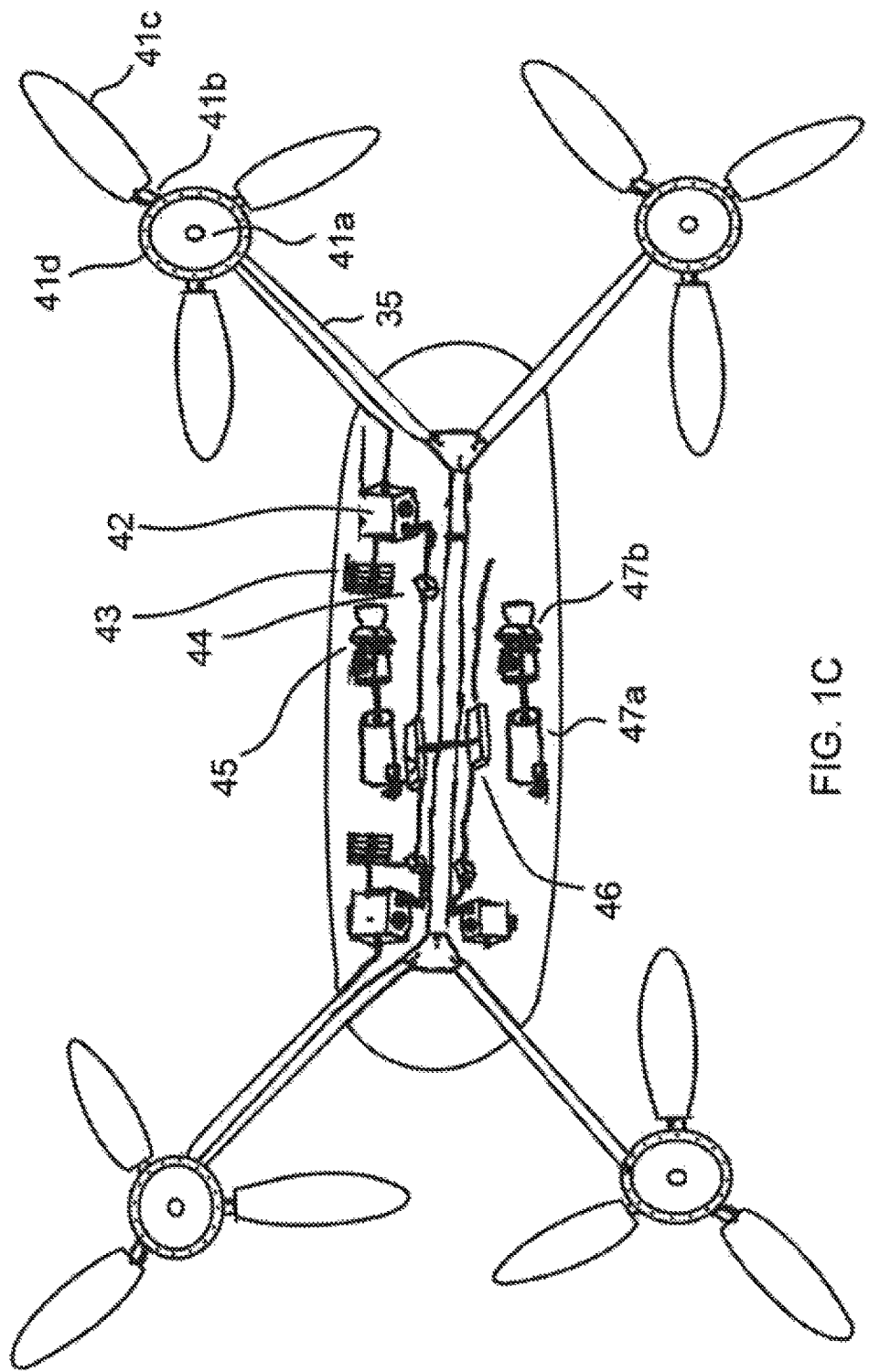

In this disclosure, a centralized system 8 has a power generation system which provides power to each of the air lift devices 30 as shown in FIG. 1C. In another embodiment, a turbo electric generator provides electricity for pylon mounted air lift motors 30 (e.g., electric motor driven rotors). The centralized system 8 allows energy storage which can be shifted to individual air lift motors 30 at will, allowing temporary thrusting periods which exceed the net generating capability of the onboard powerplant (emergency power for rapid climbs or obstacle avoidance).

In a further embodiment of the present invention, the centralized system 8 could include the following components: a lift motor 41a, a variable pitch assembly 41b, a blade 41c, rotor hub 41d, mounting spar 35 (also referred to as a mounting pylon), electronic lift controller 42 (also referred to as a lift controller 42), battery (storage system) 43, power storage controller 44, powerplant/energy source 45, bus tie, generator 47a, a micro-turbine 47b, shaft coupled 47c and output leads 47d (See FIGS. 1C and 3B respectively). In alternative embodiment of the present invention, the centralized system 8 could include the following components: a piston engine 48 having a servo controlled throttle 48 (See FIG. 3A).

In this disclosure, a decentralized system 7 requires each of the air lifting devices 30 to generate its own power for lift generation (See FIG. 1B). The decentralized system 7 can be beneficially comprised of, but not limited to, rocket motors, gas motors, pylon mounted jet engines, thrusters or any other thrust generating device. A decentralized system 7 is shown in FIG. 1B showing, but not limited to, an internal combustion engine driven rotor system.

Power Distribution (See Diagram in Powerplant):

The electric motor variant utilizes power from a central powerplant 400 and energy storage device reserve (See FIG. 1C). Either fixed pitch or variable pitch, motor maintains appropriate RPM and torque to the attached rotor system commensurate with the amount of thrust requested from the avionics (See FIG. 1C). The motor receives power from a power regulating device managed by the avionics suite 500 (See FIG. 5).

In a further embodiment of the present invention, the individual powered lift generating devices 30 use a standard energy source to directly power each air lift motor 30. The avionics suite 500 controls each lift generating device 30 to maintain a specific RPM or torque requirement for the fixed or variable pitch rotor system or controls the thrust output of an alternate thrust generating device (See FIGS. 1B, 1C and 5).

Referring to FIG. 4A, a flowchart is shown that depicts a centralized power distribution system 445 corresponding to one embodiment of the present invention.

Figure 4B:
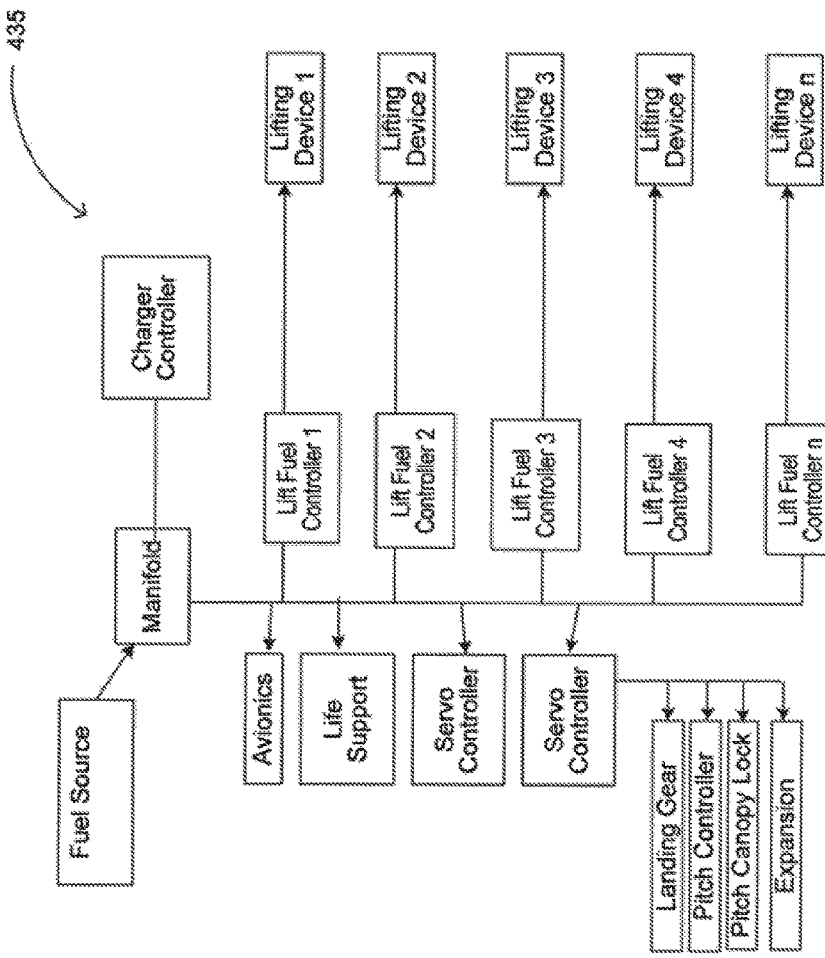
FIG. 4B shows a flowchart for de-centralized power distribution/generation.

FIG. 4B shows a flowchart that depicts a de-centralized power distribution system 435 corresponding to another embodiment of the present invention.

Figure 5:
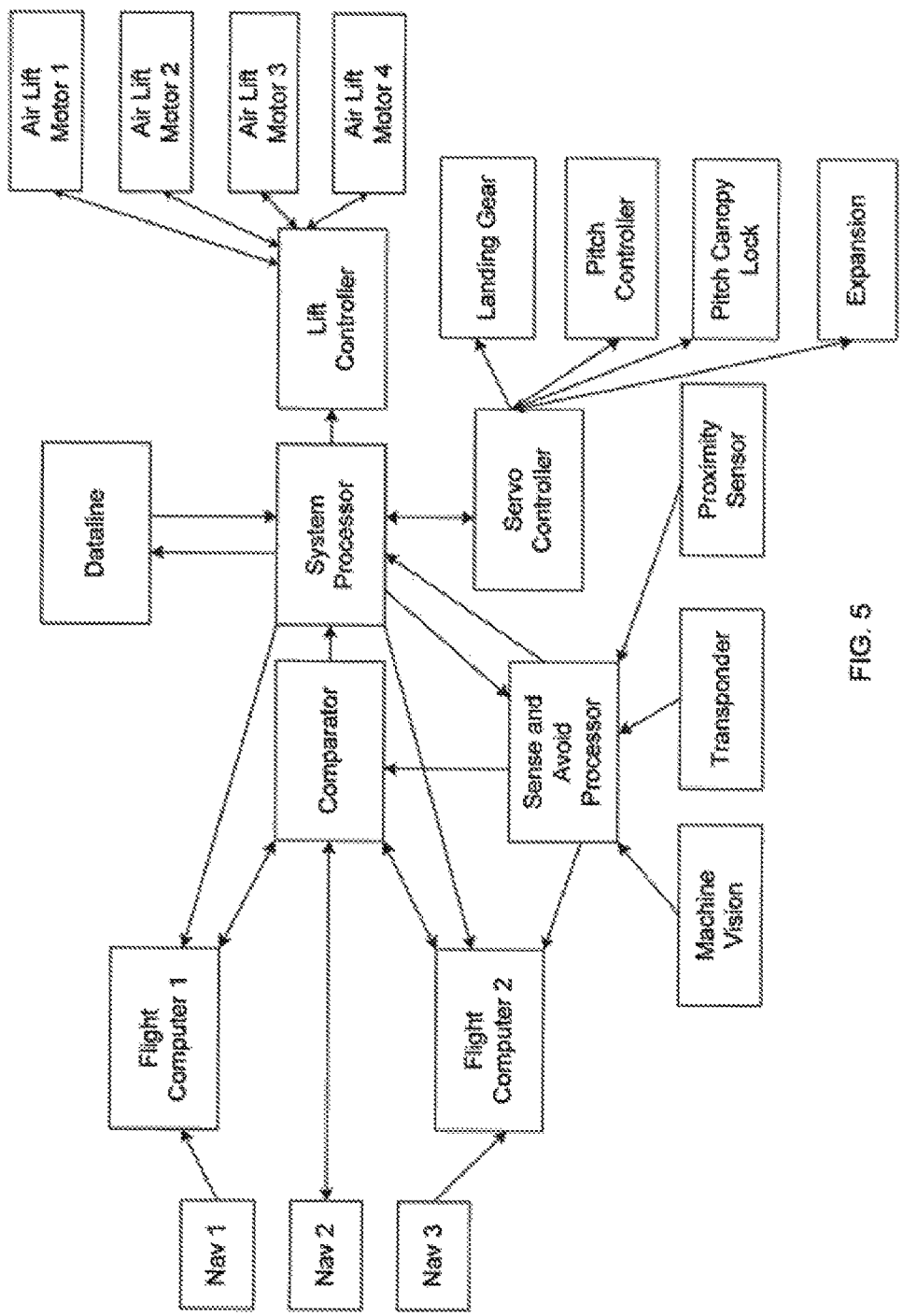
FIG. 5 illustrates an avionics layout for an electric lift motor variant.
Figure 7:
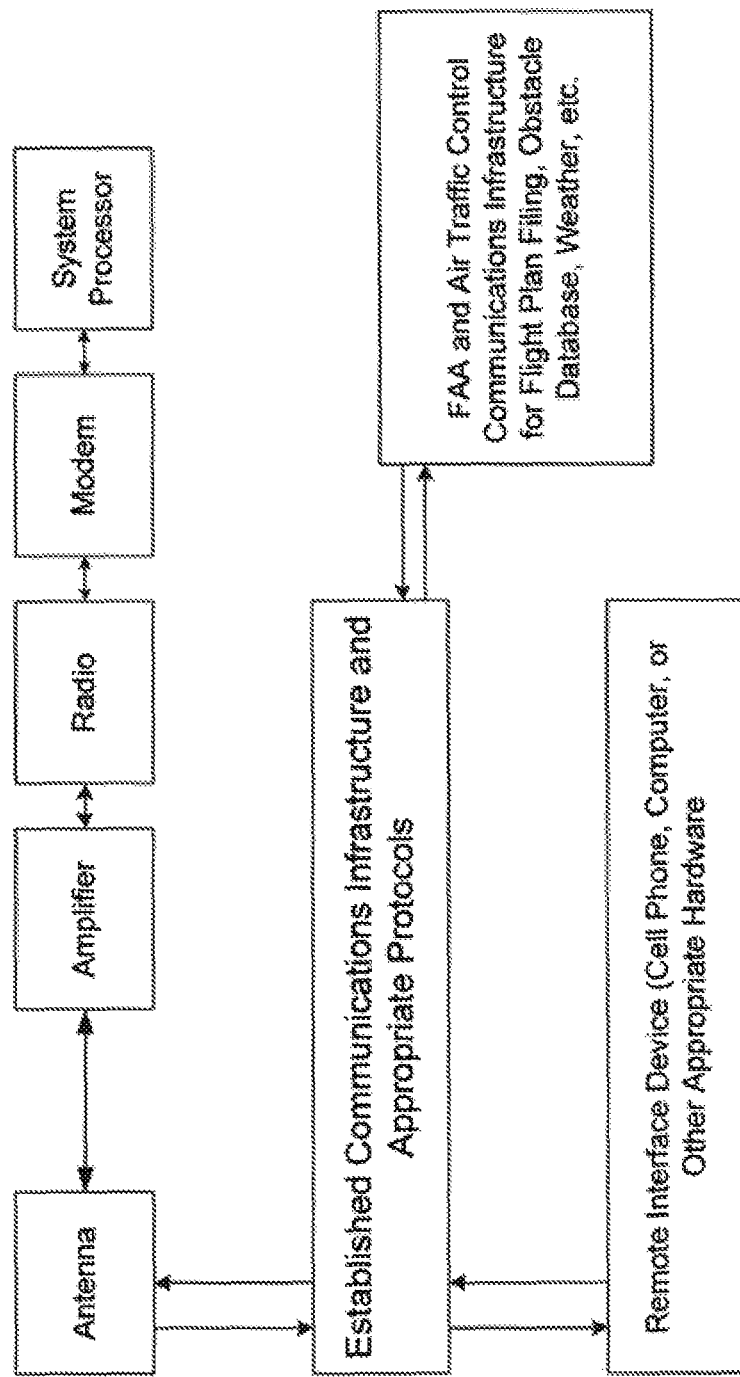
FIG. 7 illustrates a datalink flowchart for one embodiment of the present invention.

Avionics:

The AV 100 uses redundant avionic suites with redundant radio navigation hardware (e.g., GPS antenna/receivers 20/25) and redundant communication systems (See FIGS. 1A, 5 and 7). The avionics suite 500 connects to remote users via a datalink 700 to the network of their choice. The protocol and hardware of the datalink 700 is dependent on the end user (e.g., cellular network or military radio). The AV 100 has sense and avoid functionality 45 (e.g., navigation sensors) to include a transponder and the ability to map landing zones using machine vision and mapping systems (See also FIG. 1A). FIG. 5 exemplifies a flowchart that depicts the avionics suite 500 corresponding to one embodiment of the present invention.

Medical Monitoring System:

In one embodiment, the AV 100 contains a computer device 605 which monitors the medical sensors 600/610/800 and provides commands to systems capable of being remotely manipulated (e.g., defibrillator, drug administration, ventilator, etc.) (See FIGS. 6 and 8). In another embodiment, the medical monitoring system 600/610/800 sends and receives commands through the avionics suite 500 and the data-link 700 as shown in FIGS. 5 & 7.

The Automated Air Ambulance 100 must compete with manned patient extraction systems (e.g., ground or air ambulances) by permitting enroute patient treatment. A key feature of the system includes an interfaced patient treatment suite 600/610/800 with monitoring and limited remote treatment options. Depending on the configuration and medical skill available at the point of injury, treatment options include, but are not limited to: defibrillation, Intra Venous drug administration, blood administration and ventilation (See FIGS. 6 and 8).

Figure 6:
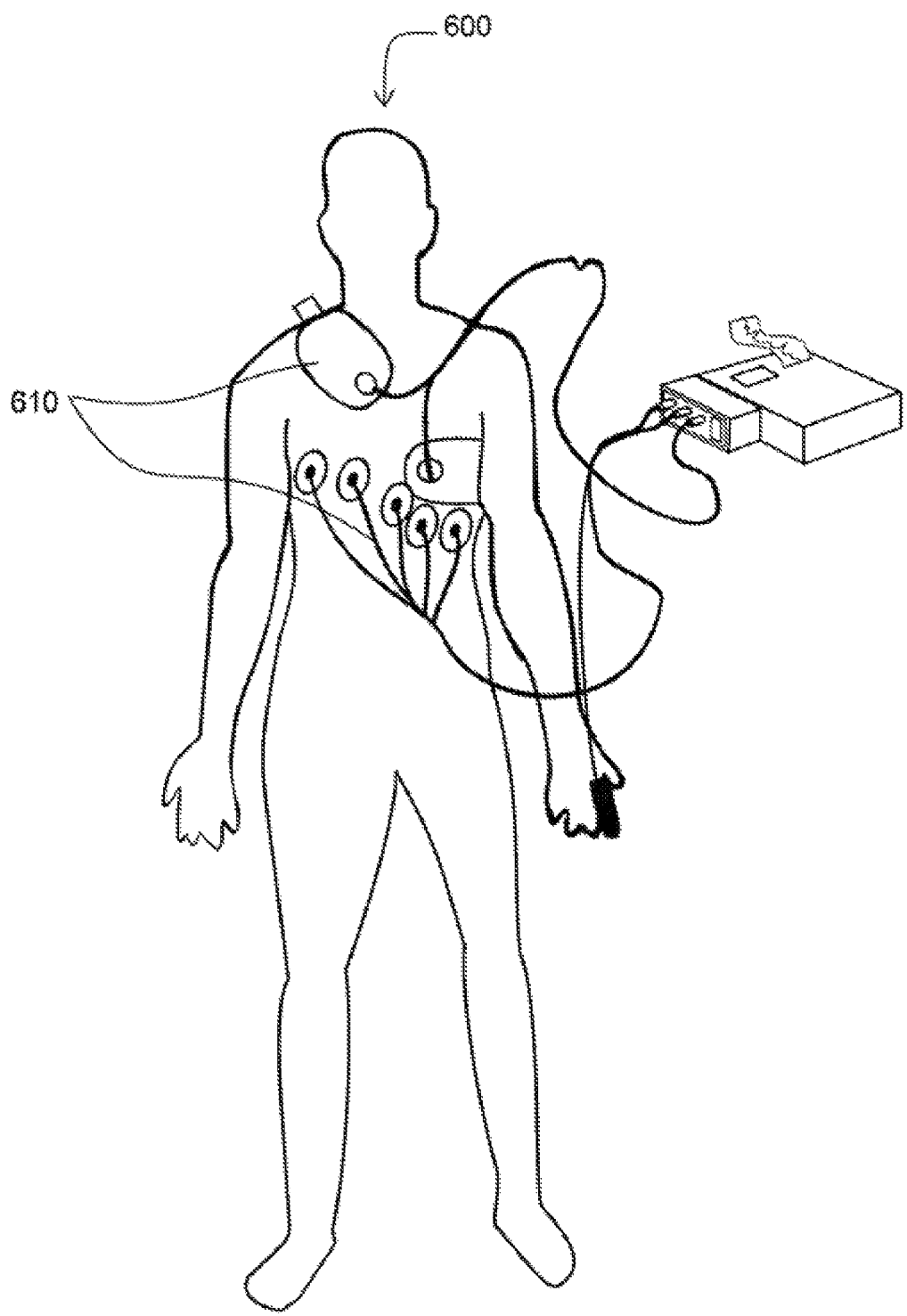
FIG. 6 illustrates a medical monitoring system for one embodiment of the present invention.
Figure 8:
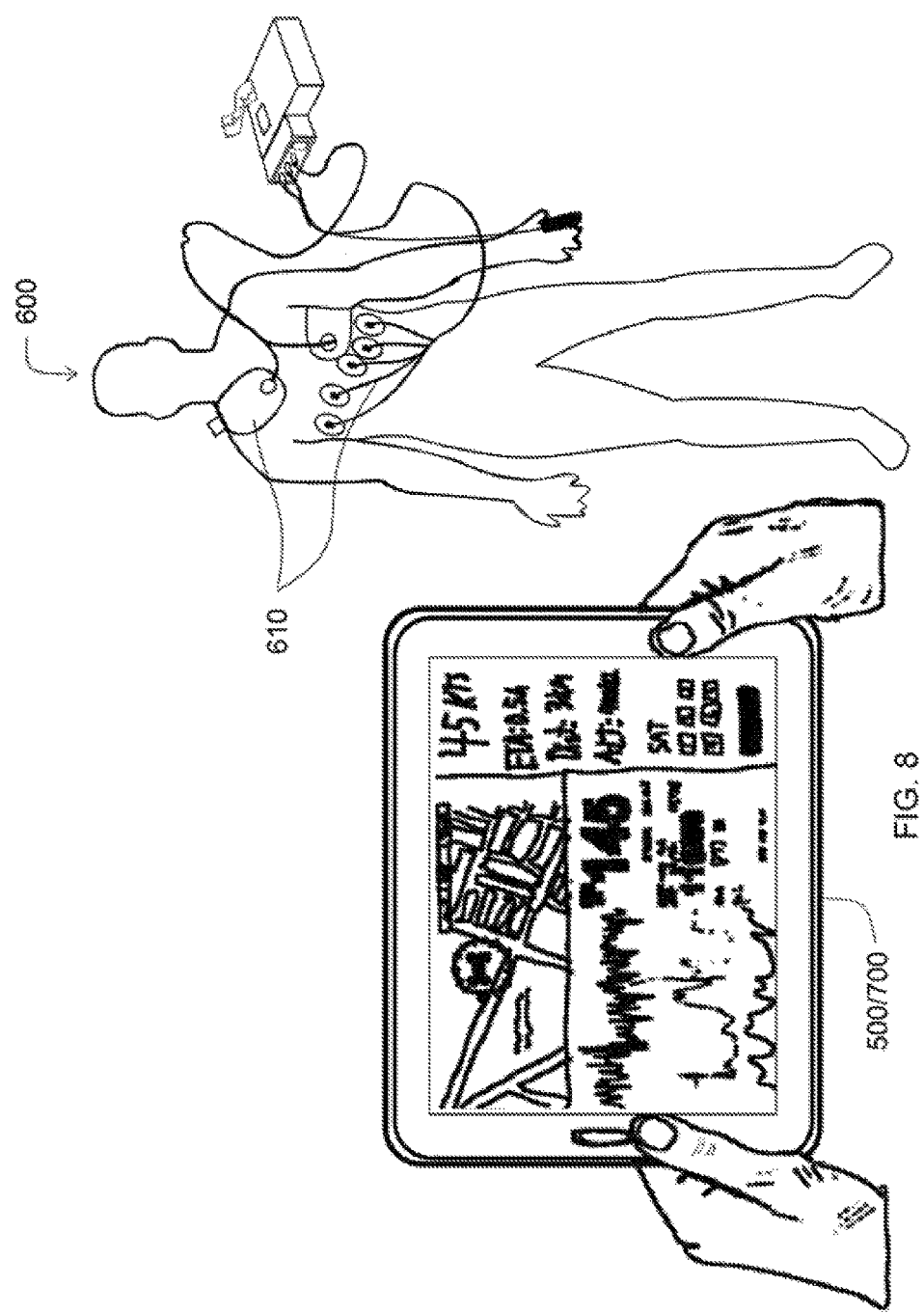
FIG. 8 shows suite of life support and monitoring devices.

Referring still to FIGS. 6 and 8, patient monitoring systems 600/610/800 provide medical providers and/or treatment centers with real time vital statistics of the patient while enroute to the facility. The sensors will require little medical knowledge to apply (e.g., similar to consumer grade Automatic Electronic Defibrilators).

The datalink 700 maintains a constant two-way interface between the treatment facility and the AV. Redundant communications protocols will be implemented to avoid a lost signal.

Figure 13:
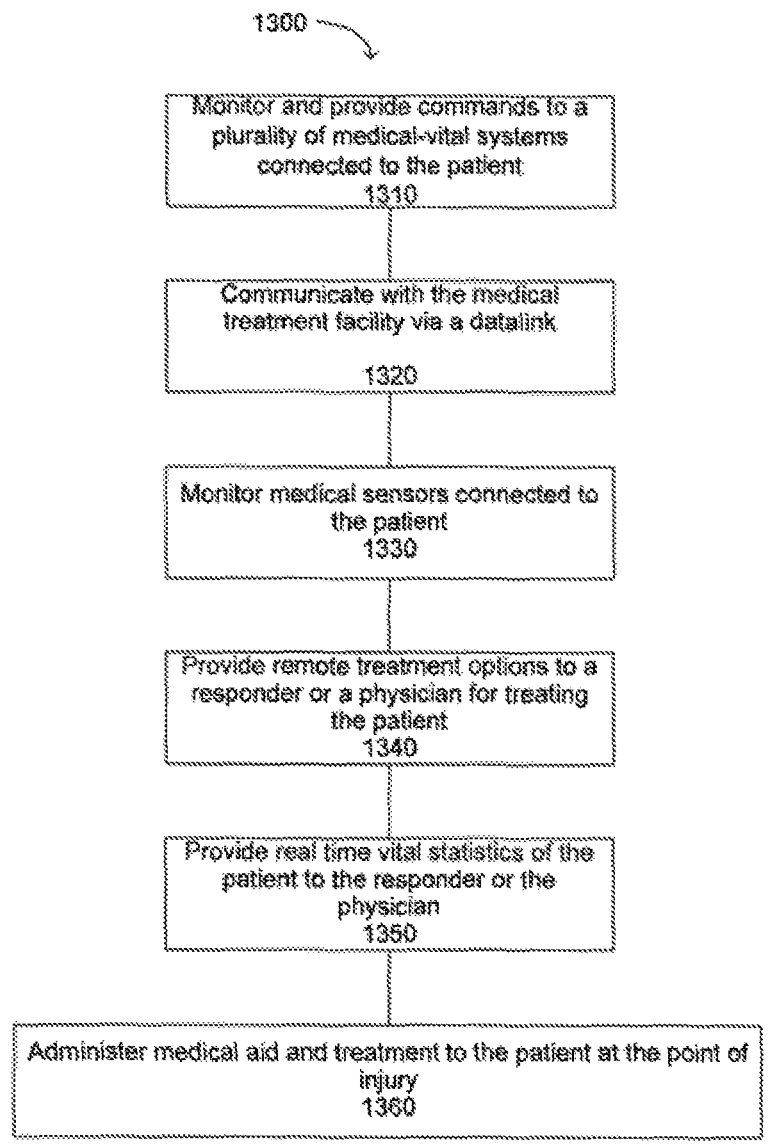
FIG. 13 is directed to an execution diagram corresponding to patient suite functions.
Figure 14:
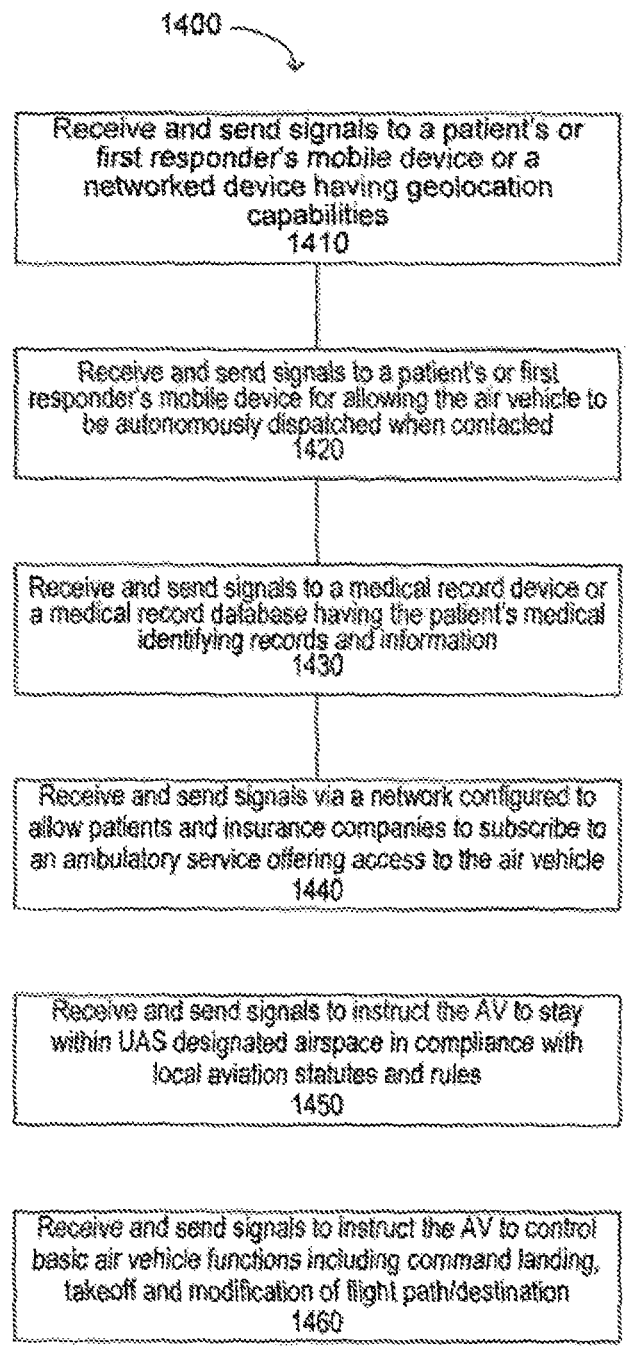
FIG. 14 is directed to an execution diagram corresponding to the data link functions.

In one embodiment of the present invention, an automated life support and monitoring patient suite 600/610/800 includes a plurality of life support and monitoring devices and medical supplies (See FIGS. 6 and 8). The patient suite will have a processing device 605 configured to execute a predefined set of basic operations in response to receiving a corresponding basic instruction selected from a predefined native instruction set of codes. The processing device includes: memory 605; a first set of machine codes selected from the native instruction set configured to monitor and provide commands to a plurality of medical-vital systems connected to the patient 1310, the medical-vital systems configured to be remotely monitored and controlled 1340; a second set of machine codes selected from the native instruction set configured to communicate with the medical treatment facility via a datalink 1320; a third set of machine codes selected from the native instruction set configured to monitor medical sensors connected to the patient 1330; a fourth set of machine codes selected from the native instruction set configured to provide remote treatment options to a responder or a physician for treating the patient 1340; a fifth set of machine codes selected from the native instruction set configured to provide real time vital statistics of the patient to the responder or the physician 1350; and a sixth set of machine codes selected from the native instruction set configured to administer medical aid and treatment to the patient at the point of injury 1360, wherein each of the first, second, third, fourth, fifth, and sixth set of machine code is stored in the memory (See FIG. 13).

Datalink:

The datalink 700 provides bidirectional data from the AV 100 to remote monitoring and treatment systems (See FIG. 7). It also permits the system processor to receive (e.g., instructions from medical providers) and/or send data to medical health providers and first responders from various AV 100 systems The Autonomous Air Ambulance 100 contains a suite of life support 700/800 and monitoring devices 700/800 which communicate to treatment facilities (e.g., hospitals) through the configured datalink 700 (See FIGS. 6, 7 and 8). The system provides health care providers real time information on the patient vitals and the ability to administer limited medical aid (e.g., defibrillation, ventilation or IV drugs as the device is configured). The remote terminal also permits the health care providers to divert the patient to another treatment facility if the patient needs a different level of care.

In another embodiment of the present invention, a bidirectional datalink is coupled to the air vehicle (See FIG. 7). The datalink will communicate with a system processing device 705 which is configured to execute a predefined set of basic operations in response to receiving a corresponding basic instruction selected from a predefined native instruction set of codes. The processing device includes: memory; a seventh set of machine codes selected from the native instruction set configured to receive and send signals to a patient's or first responder's mobile device or a networked device having geolocation capabilities, thereby enabling the air vehicle to obtain the geographic earth location of the patient 1410; an eighth set of machine codes selected from the native instruction set configured to receive and send signals to the patient's or first responder's mobile device for allowing the air vehicle to be autonomously dispatched when contacted by the patient's the first responder's mobile device or the networked device 1420; a ninth set of machine codes selected from the native instruction set configured to receive and send signals to a medical record device or a medical record database having the patient's medical identifying records and information 1430; a tenth set of machine codes selected from the native instruction set configured to receive and send signals via a network configured to allow patients and insurance companies to subscribe to an ambulatory service offering access to the air vehicle, the ambulatory service providing the subscribers with priority access to the air vehicle 1440; an eleventh set of machine codes selected from the native instruction set configured to receive and send signals to instruct the AV to remotely dispatch via IT connected devices or manually dispatch to the point of injury (See FIG. 7); a twelfth set of machine codes selected from the native instruction set configured to receive and send signals to instruct the AV to autonomously navigate to the point of injury, utilizing uncontrolled or controlled air space and c-filed flight plans (See FIG. 7); a thirteenth set of machine codes selected from the native instruction set configured to receive and send signals to instruct the AV to stay within UAS designated airspace in compliance with local aviation statues and rules 1450; and a fourteenth set of machine codes selected from the native instruction set configured to receive and send signals to instruct the AV to control basic air vehicle functions that include command landing, takeoff and modification of flight path/destination 1460, wherein each of the seventh through fourteenth set of machine code is stored in the memory (See FIGS. 5 & 7).

Figure 10:
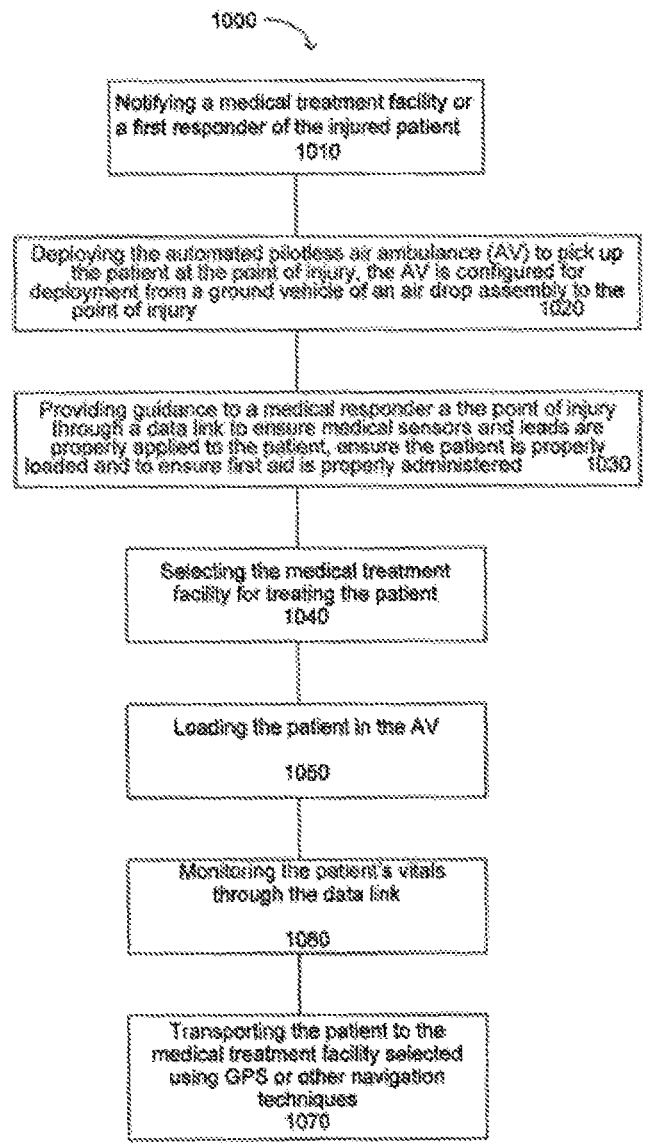
FIG. 10 is directed to an execution diagram used for Medical Evacuation (MEDEVAC).
Figure 11:
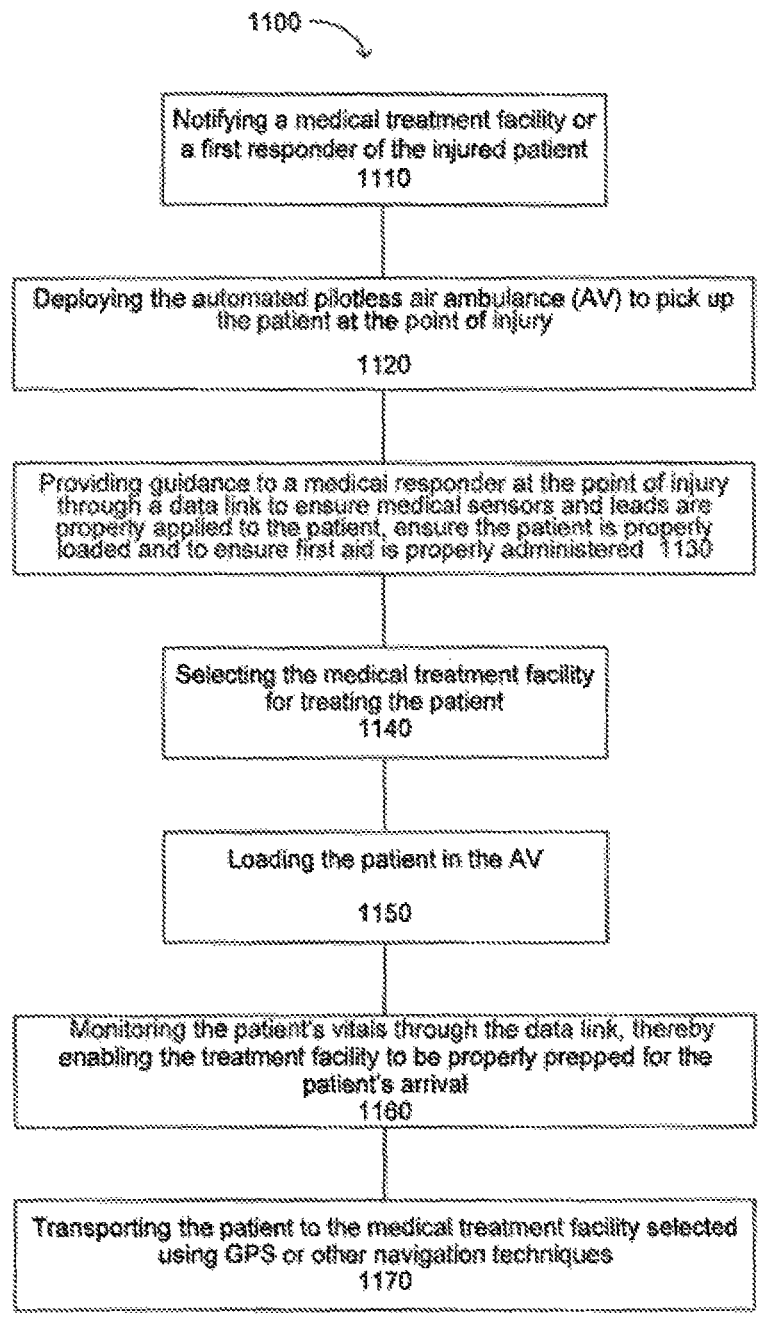
FIG. 11 is directed to an execution diagram used for consumer variants.

Concept of Use Military Variant:

Two scenarios exist for the military variant (See FIGS. 10-11). A vehicle mounted AV/Air dropped AV 100 and an AV 100 staged separately from the point of injury.

Vehicle Mounted or Air Dropped AV:

Upon notification of an injury, a vehicle (e.g., Truck, trailer, etc.) carrying the AV 100 moves to the location of the patient or an AV 100 is released from an aircraft overhead (similar to a life raft from a coast guard plane). At least one operator removes the AV 100 from the ground vehicle or air drop assembly, conducts field assembly of the AV and turns the AV on. The patient 15 is loaded on the AV 100. Appropriate sensors are applied and/or connected to the patient as well as restraints. The first responder selects the medical treatment facility on the AV's user interface or his military networked device. The AV takes off and flies (with the patient) to the commanded medical treatment facility. The AV 100 lands at the medical treatment facility and shuts down, allowing medical personnel to remove the patient 15. The system may be refueled/recharged and returned to the point of injury for disassembly and remounting on the vehicle.

The AV 100 may be configured in a ready to fly packaged configuration for transportation on vehicles or it can be air dropped into remote locations as shown in FIG. 9. Individuals will have immediate access to a functioning Air Vehicle 100. This allows organizations to travel with their own dedicated air ambulance service and not have to rely on pre-existing treatment facilities with Automated Air Ambulances on standby (Staged AV). It also allows for the extraction of personnel from completely inaccessible locations during natural disasters which restrict manned air ambulance flights (e.g., fires, hurricanes, etc.). As shown in FIG. 9, one embodiment of the present invention includes powerplant inlets 37 and a canopy 37 that also includes a clear canopy 50*a* section.

Staged AV:

In many situations, military personnel operate on small bases with limited medical capabilities beyond first aid. The AV 100 would be maintained at the small base. If an injury occurs within the AVs range, operators would power up the AV, enter the Point of Injury and allow the AV to fly (empty) to the injured individual. Operators could alternatively communicate directly via military network (e.g., radio or data) and remotely dispatch the AV to the needed location, negating any human involvement at the dispatching location.

The AV 100 would land and power down as operators load the patient 15 onto the AV 100. Once loaded and connected to the monitoring systems, the operator would select the location of the appropriate treatment facility in range on the AV's user interface.

As shown in FIG. 10, the medical treatment facility maintains a fleet of Autonomous Air Ambulances. When they receive a call for Medical Evacuation (MEDEVAC), the facility launches an Air Vehicle to the point of injury. The treatment facility monitors the AV's.

Referring still to FIG. 10, health care providers can provide guidance to the individuals at the point of injury through the AV interface (e.g., status through the data link) to ensure the patient is properly loaded and first aid administered. The health care providers can then monitor the patient's vitals through the datalink and prep the treatment facility for the patient's arrival.

Referring again to FIG. 10, upon arrival, the providers at the treatment facility offload the patient and move them into the facility. The AV is powered down, fueled/recharged and serviced. Once reset, it is placed back in standby for the next MEDEVAC mission.

Referring further to FIG. 10, when an individual becomes injured in a remote location, the personnel accompanying the individual calls back to the nearest medical treatment facility and requests an Automated Air Ambulance 100 depending upon the severity of the injury.

Referring still to FIG. 10, on arrival of the Automated Air Ambulance, the personnel load the patient on the AV 100, following all instructions from the health care provider (e.g., physician) via the intercom on the AV. They ensure all medical leads are connected, the patient is secure, and they launch the AV for return to the treatment facility.

Referring one again to FIG. 10, the AV 100 would fly (carrying the patient) to the treatment facility. Once the AV 100 lands, it shuts down and medical personnel offload the patient 15. The AV 100 would be refueled/recharged and re-dispatched to the forward location for any future requirements.

Concept of Use (Civil Variant-FAA/ICAO Regulations Omitted):

Referring to FIG. 11, the civil variant 1100 of the platform uses a far more integrated communications system with commonly available communication infrastructure (e.g., cellular technology) and radio data transmission technology. The civil variant 1100 integrates into local 911 emergency medical services jurisdictions, providing a network of airborne medical evacuation coverage. On receipt of dispatch orders from a 911 switchboard, an operator of this device will launch the AV 100 with the location of the point of injury and treatment facility. Alternatively, a fully automated system will allow the system software to automatically dispatch an AV 100 without human interaction. The AV 100 will abide by UAS flight regulations and fly to the point of injury utilizing GPS 20 or other navigation techniques and published flight hazards database (for obstacle avoidance) (See also FIG. 1A). The AV 100 will land in an appropriate location (self-clearing the landing area with machine vision/mapping hardware). First responders will load the patient 15 into the air vehicle 100. Voice and/or video commands from the air vehicle and through the datalink 700 intercom will beneficially assist non-trained personnel with loading procedures. Once loaded and first responders clear, the air vehicle 100 will autonomously take off, with the patient 15, and fly directly to the appropriate treatment facility using the aforementioned methodology. Upon landing at the treatment facility, the system 100 will shut down and care providers will offload the patient 15. The AV 100 will be refueled/recharged and placed back in standby mode ready for dispatch.

Referring still to FIG. 11, consumer variants of the system permit datalinks using cellular technology and infrastructure. Smart phone devices may have applications installed to streamline the requesting process for an Automated Air Ambulance. Using the geolocation data from the requesting communication device (e.g., cell phone), an automated network of the Automated Air Ambulance can autonomously select the nearest device and dispatch it to the requestor. Such an automated system could also be subscriber based and linked to health insurance.

Figure 12:
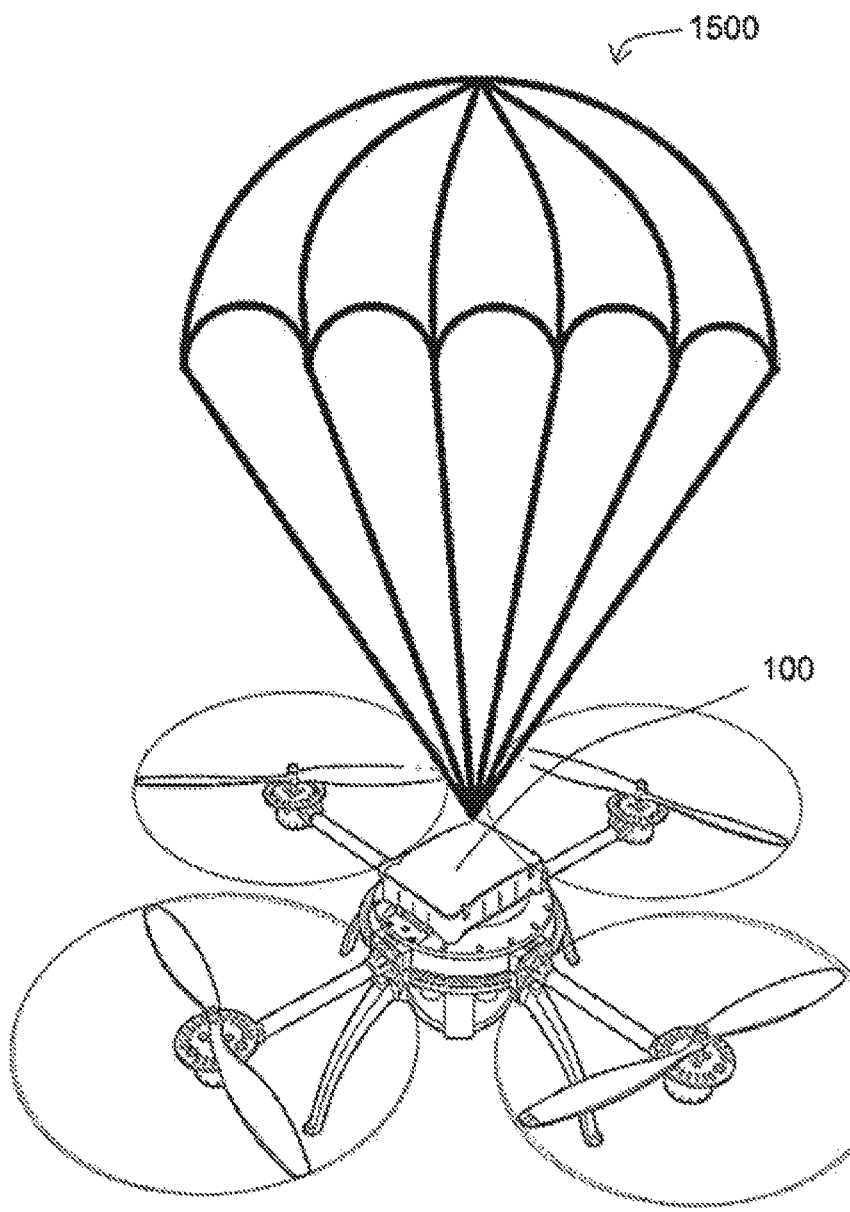
FIG. 12 depicts one embodiment of the invention configured to advantageously include a ballistic parachute.

Ballistic Parachute:

As shown in FIG. 12, one embodiment of the present invention includes an emergency recovery system, such as a ballistic parachute 1200 configured to deploy/eject rapidly under force for allowing the AV system 100 to advantageously have an expanded recovery envelope in emergency situations. The emergency recovery system may include a steerable recovery device (e.g., parachute) aptly configured to allow the AV system 100 to beneficially control the recovery of said AV to a suitable landing area (e.g. road for ground ambulance).

It should be understood from this disclosure that the foregoing relates to various embodiments of the invention and that modifications may be made without departing from the spirit and scope of the present invention. It should also be understood that the present invention is not limited to the designs mentioned in this application and the equivalent designs in this description, but it is also intended to cover other equivalents now known to those skilled in the art, or those equivalents which may become known to those skilled in the art in the future.

INDUSTRIAL APPLICABILITY

The invention pertains to an unmanned aerial vehicle (AV) capable of performing human medical evacuation operations (MEDEVAC/Air Ambulance), which may be of value or importance to institutions/organizations such as the military, and/or also having significant value or importance in a civilian setting.

What is claimed is:

1. An automated pilotless air ambulance system comprising:
    an air vehicle (AV) having a fuselage, the fuselage having a stretcher mounted thereon for carrying a patient, the air vehicle configured to be dispatched to a point of injury of the patient and further configured to transport the patient to a medical treatment facility;
    a plurality of air-lift motors coupled to the fuselage for vertically lifting the air vehicle, each air lift motor being coupled to a mounting arm such that the air lift motors are disposed substantially in the front and back of the fuselage, thereby enabling the stretcher to be transported with the patient thereon into and out of the AV, and wherein each mounting arm is securely coupled to the fuselage to form a low-profile configuration, whereby the patient is nested in the AV such that each air lift motor is disposed substantially on the same plane as the patient;
    an automated life support and monitoring patient suite having a plurality of life support and monitoring devices and medical supplies; and
    a bidirectional datalink coupled to the air vehicle, the datalink configured to execute the following functions:
        receive and send signals to a patient's or first responder's mobile device or a networked device having geolocation capabilities, thereby enabling the air vehicle to obtain a geographic earth location of the patient;
        receive and send signals to the patient's or first responder's mobile device for allowing the air vehicle to be autonomously dispatched when contacted by the patient's or the first responder's mobile device or the networked device;
        receive and send signals to at least one medical health provider or physician who is using another air vehicle (AV) system to provide guidance to the first responder; and
        receive and send signals to the at least one medical health provider or physician in order to allow the at least one medical health provider or physician to monitor the patient's vitals and to prepare the medical treatment facility for the patient's arrival.

2. The system according to claim 1, wherein the AV includes a plurality of onboard decentralized powerplants or a plurality of onboard centralized powerplants or an onboard power supply for power generation, each powerplant providing energy to the plurality of air-lift motors for vertically lifting the AV.

3. The system according to claim 1, wherein the stretcher is coupled to a pivotal arm, thereby enabling the stretcher to be transported with the patient thereon into and out of the fuselage, and wherein the stretcher is configured to remain horizontal with respect to the ground as the pivotal arm is rotated.

4. The system according to claim 2, wherein the plurality of decentralized or centralized powerplants include a pylon mounted powerplant, and wherein each powerplant further includes a plurality of powered generator motors configured to function in cooperation with each air-lift motor for power generation.

5. The system according to claim 1, wherein the patient suite is configured to measure various patient parameters and to execute the following functions:
    monitor and provide commands to a plurality of medical-vital systems and sensors connected to the patient, the medical-vital systems and sensors configured to be remotely monitored and controlled;
    communicate with the medical treatment facility via a datalink;
    provide remote treatment options to the first responder or the physician for treating the patient;
    provide real time vital statistics of the patient to the first responder or the physician; and
    administer medical aid and treatment to the patient at the point of injury.

6. The system according to claim 1, wherein the bidirectional datalink is further configured to execute the following functions:
    receive and send signals to a medical record device or a medical record database having the patient's medical identifying records and information;
    receive and send signals via a network configured to allow patients and insurance companies to subscribe to an ambulatory service offering access to the air vehicle, the ambulatory service providing the subscribers with priority access to the air vehicle;

receive and send signals for providing instructions to the AV to remotely dispatch via IT connected devices or manually dispatch to the point of injury;

receive and send signals to instruct the AV to autonomously navigate to the point of injury, utilizing uncontrolled or controlled air space and e-filed flight plans;

receive and send signals to instruct the AV to stay within UAS designated airspace in compliance with local aviation statues and rules; and receive and send signals to instruct the AV to control basic air vehicle functions including command landing, takeoff and modification of flight path/destination.

7. The system according to claim 1, wherein the air vehicle further includes a terrain and motion sensing device for allowing the air vehicle to map at least one landing zone to land safely.

8. The system according to claim 1, further including navigation and terrain sensors coupled to the air vehicle for identifying terrain obstacles, thereby enabling the air vehicle to navigate to a destination point, avoid obstacles and to safely land.

9. The system according to claim 1, wherein the air vehicle is suitably configured to carry at least one patient and at least one first responder.

10. The system according to claim 1 further including a two-way video intercom coupled to the air vehicle, thereby enabling the medical treatment facility to visually observe and to verbally communicate with the patient and first responder via the bidirectional datalink.

11. The system according to claim 5, wherein the measured parameters being monitored via the medical sensors include ECG, blood pressure, blood saturation, blood chemistry, heart rate, temperature and breathing.

12. The system according to claim 1, wherein the automated life support and monitoring patient suite includes oxygen administration, saline and IV drug administration, defibrillation, localized pressure and thermal regulation.

13. The system according to claim 1, wherein the powered air-lift motors include AC or DC electric motors, propellers, at least one rocket engine, thruster or turboshaft engine, gas engine, or ionic thruster.

14. The system according to claim 1, wherein the patient's or the at least one first responder's mobile device is a tablet computer, a smartphone or a handheld computer, wherein said mobile device further includes an application program configured to provide location or navigation services.

15. The system according to claim 1 further including a redundant avionics suite, wherein the avionic suite further includes redundant navigation hardware.

16. The system according to claim 1, wherein the air vehicle further includes a ballistic parachute configured to eject under force, thereby enabling the parachute to open rapidly in emergency situations with a steerable lifting body to control a descent of the AV to a suitable and safe landing area.

17. A method of transporting a patient to a medical facility or treatment center using an automated pilotless air ambulance, the method comprising the steps of:

notifying a medical treatment facility or a first responder of an injured patient;

deploying the automated pilotless air ambulance (AV) to pick up the patient at a point of injury, the AV having a plurality of air lift motors coupled to the fuselage in a low-profile configuration, each air lift motor having at least one variable pitch blade for allowing the AV to land and maneuver safely, each air lift motor also being coupled to a mounting arm such that the air lift motors are disposed substantially in the front and back of the fuselage, thereby enabling a stretcher to be transported with the patient thereon into and out of the AV, and wherein each mounting arm is securely coupled to the fuselage to form the low-profile configuration, whereby the patient is nested in the AV such that each air lift motor is disposed substantially on the same plane as the patient, and wherein the AV is configured to deploy from a ground vehicle or an air drop assembly to the point of injury;

receiving and sending signals through a bidirectional data link to instruct the AV to autonomously navigate to the point of injury, utilizing uncontrolled or controlled air space and e-filed flight plans;

loading the patient in the AV via at least one operator;

providing guidance to a medical responder at the point of injury through the bidirectional datalink to ensure medical sensors and leads are properly applied to the patient, ensure the patient is properly loaded and to ensure first aid is properly administered;

selecting the medical treatment facility for treating the patient;

monitoring the patient's vitals through the data link, thereby enabling the treatment facility to be properly prepped for the patient's arrival;

transporting the patient to the medical treatment facility selected using GPS or other navigation techniques;

receiving and sending signals through the data link to instruct the AV to stay within UAS designated airspace in compliance with local aviation statues and rules; and receiving and sending signals through the data link to instruct the AV to control basic air vehicle functions including command landing, takeoff and modification of flight path/destination.

18. The method of claim 17, wherein the stretcher is coupled to a pivotal arm, thereby enabling the stretcher to be transported with the patient thereon into and out of the fuselage, and wherein the stretcher is configured to remain horizontal with respect to the ground as the pivotal arm is rotated.

19. A method of transporting a patient to a medical facility or treatment center using an automated pilotless air ambulance, the method comprising the steps of:

receiving and sending signals via a network configured to allow patients and insurance companies to subscribe to an ambulatory service offering access to the air vehicle (AV), the ambulatory service providing the subscribers with priority access to the air vehicle;

notifying a medical treatment facility or a first responder of an injured patient;

deploying the automated pilotless air ambulance (AV) to pick up the patient at a point of injury, the AV having a plurality of air lift motors coupled to the fuselage, each air lift motor being coupled to a mounting arm such that the air lift motors are disposed substantially in the front and back of the fuselage, thereby enabling a stretcher to be transported with the patient thereon into and out of the AV, wherein the stretcher is coupled to a pivotal arm and configured to remain horizontal with respect to the ground as the pivotal arm is rotated, and wherein each mounting arm is securely coupled to the fuselage to form a low-profile configuration, whereby the patient is nested in the AV such that each air lift motor is disposed substantially on the same plane as the patient;

loading the patient in the AV via at least one operator;
providing guidance to a medical responder at the point of injury through a data link to ensure medical sensors and leads are properly applied to the patient, ensure the patient is properly loaded and to ensure first aid is properly administered;
selecting the medical treatment facility for treating the patient;
monitoring the patient's vitals through the data link, thereby enabling the treatment facility to be properly prepped for the patient's arrival; and
transporting the patient to the medical treatment facility selected using GPS or other navigation techniques.

20. The method of claim 19, wherein the bidirectional datalink is further configured to execute the following functions:
receive and send signals to a medical record device or a medical record database having the patient's medical identifying records and information;
receive and send signals via a network configured to allow patients and insurance companies to subscribe to an ambulatory service offering access to the air vehicle, the ambulatory service providing the subscribers with priority access to the air vehicle;
receive and send signals to instruct the AV to remotely dispatch via IT connected devices or manually dispatch to the point of injury;
receive and send signals to instruct the AV to autonomously navigate to the point of injury, utilizing uncontrolled or controlled air space and e-filed flight plans;
receive and send signals to instruct the AV to stay within UAS designated airspace in compliance with local aviation statues and rules; and
receive and send signals to instruct the AV to control basic air vehicle functions including command landing, take-off and modification of flight path/destination.

* * * * *